United States Patent [19]
Marks et al.

[11] 3,973,778
[45] Aug. 10, 1976

[54] ENCLOSED BELT DRIVE FOR RECORD PLAYER TURNTABLE

[75] Inventors: Larry D. Marks, St. Joseph; Lynn D. Palmer, Coloma, both of Mich.; Theodore F. Jensen, Huntington, N.Y.

[73] Assignee: Avnet, Inc., New York, N.Y.

[22] Filed: July 31, 1975

[21] Appl. No.: 600,639

[52] U.S. Cl. .............................. 274/39 R; 274/39 A
[51] Int. Cl.² ........................................ G11B 3/60
[58] Field of Search ............................ 274/39, 39 A

[56] References Cited
UNITED STATES PATENTS 1,438,765   12/1922   Kralund .......................... 274/39 R
3,048,408   8/1962   Morgan .......................... 274/39 R
3,485,498   12/1969   Smith ........................ 274/39 R X Primary Examiner—Charles E. Phillips
Attorney, Agent, or Firm—Richard P. Crowley

[57] ABSTRACT

A pin mounted on the under side of a turntable is used to hold a drive belt also engaged by a drum which is mounted on the turntable and forms a loop. Mounted on a base plate is a drive pulley. This invention solves the problem of how to assemble the turntable on the base plate and end up with the belt engaged on the pulley and the drum. During assembly the turntable is placed over the base plate with the pulley inside the loop. A simple turning of the turntable will cause the belt to tension and slip off the pin onto the pulley.

4 Claims, 11 Drawing Figures

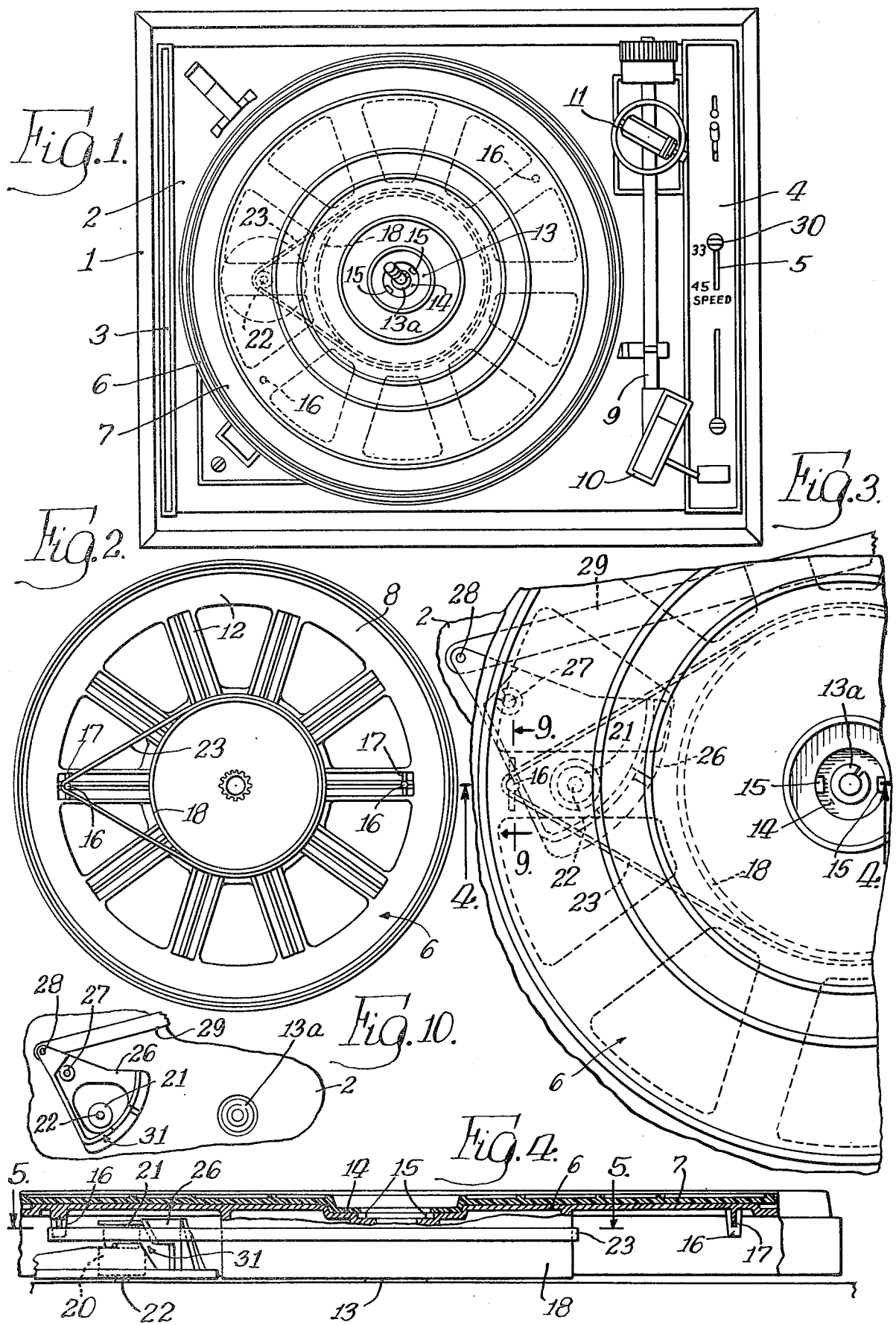

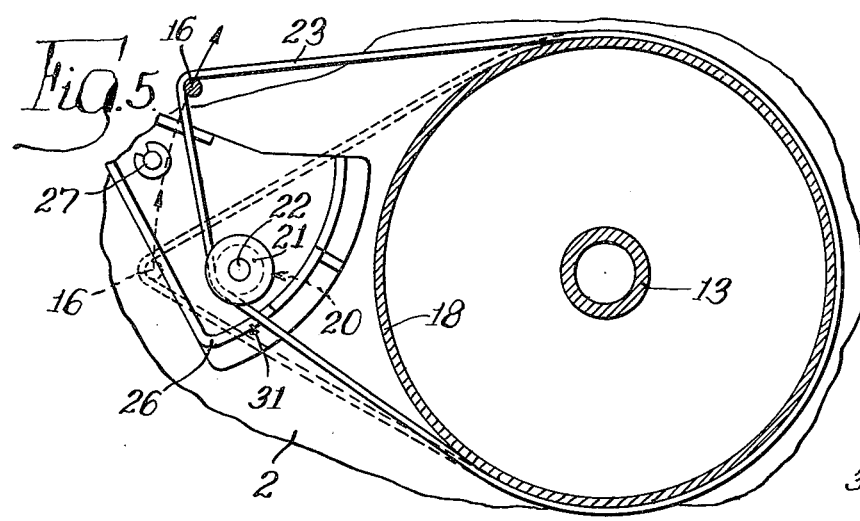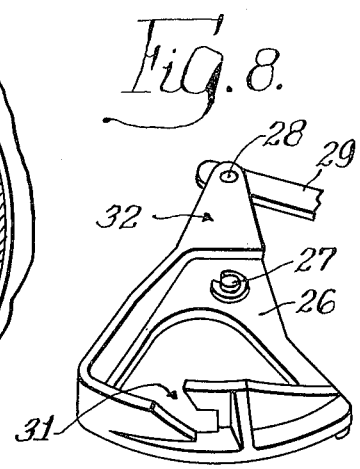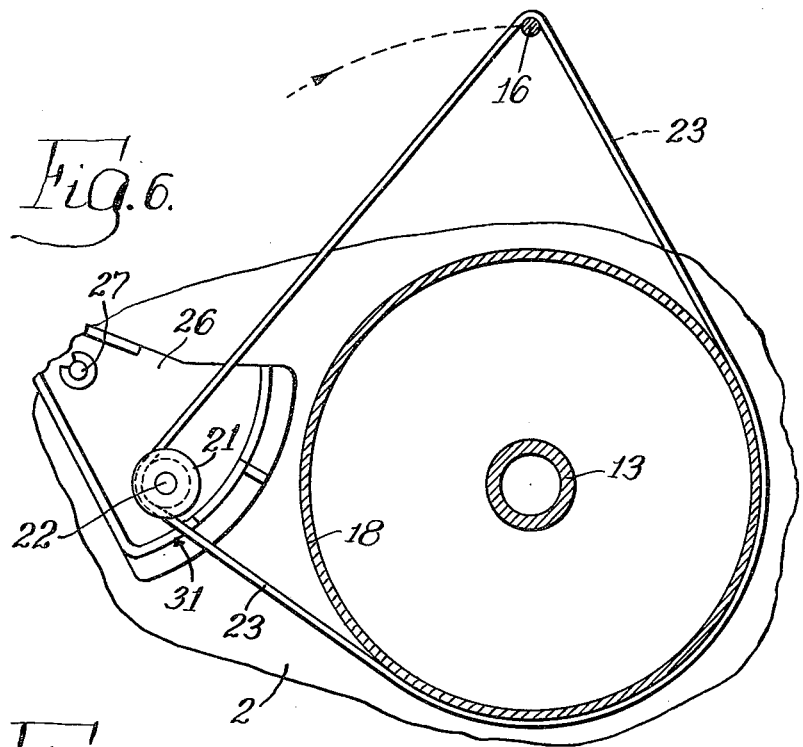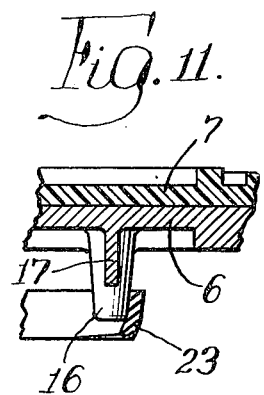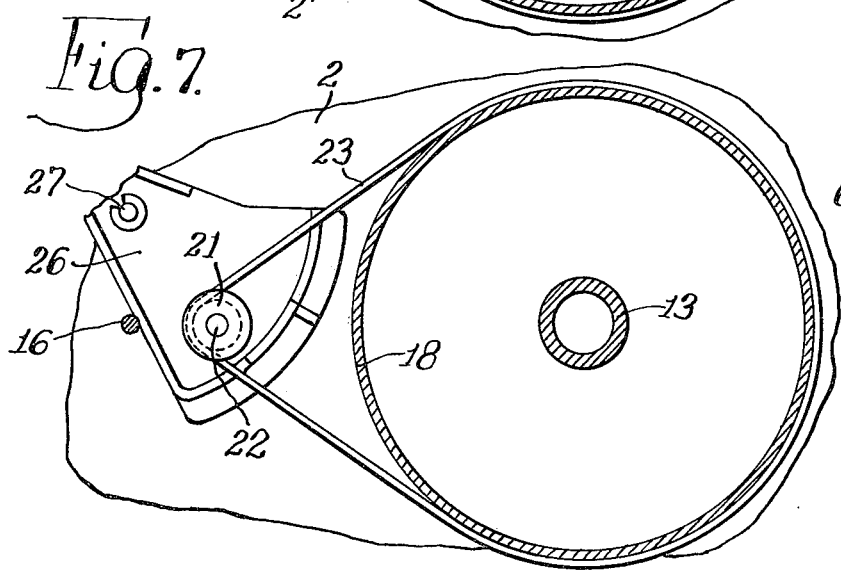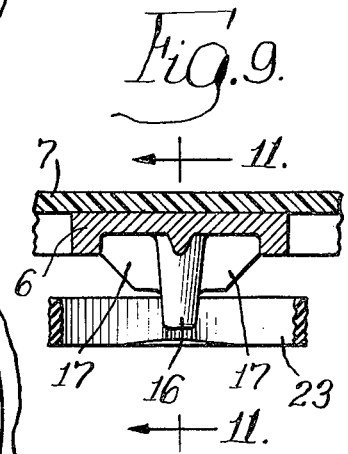

3,973,778

ENCLOSED BELT DRIVE FOR RECORD PLAYER TURNTABLE

BACKGROUND OF THE INVENTION

The art has become aware of the desirability of employing in the electric motor drive of the turntable an elastic transmission such as an elastic belt drive for the turntable because of its ability to absorb and minimize irregularities of motor torque on the turntable. The problem of protecting the belt from injury by interference with the operation thereof, accidentally, or as by failure to follow instructions, or for any other cause, can of course be solved by completely enclosing the belt drive. Less than complete protection has generally resulted in unintended abuse from lack of ability or patience in following a prescribed procedure, as printed and supplied with the machine.

The present structure, in addition to the foregoing advantages, provides the benefits of minimizing effects of sunlight and foreign matter on the belt and drive surfaces.

SUMMARY OF THE INVENTION

The invention provides in a phonograph for playing selectively two different sizes of records—such as 33 rpm and 45 rpm—a single belt drive from a two-diameter motor pulley to a single diameter, wide faced turntable drum located in the space under the upper substantially planar wall of the turntable, with the motor driving shaft pulley, the belt, and the record holding turntable for the upper boundary. Within that space is also enclosed the motor drive pulley and the elastic belt trained over the drum. The floor over which the motor pulley, the belt and the drum are arranged in horizontal assembly is a floor consisting of the main base plate of the player. This space or gallery, just mentioned, is limited above by the turntable, laterally by the depending cylindrical wall of the flange of the turntable, and below by the base plate. It contains the turntable drum, the motor pulley of two diameters, and the means by which the belt may be introduced into the restricted annular space below the turntable and assembled in driving relation by being looped over the turntable drum, and over a pin which is rigid with the drum and which extends axially downwardly from the end wall inside the drum and is disposed a substantial radial distance beyond that of the upper belt pulley. The pin is of a free length less than the width of the belt and preferably provided with a lateral angular web to locate the belt vertically on the supporting pin.

By restricting the length of the pin and disposing said triangular webs on the sides of the pins, the pins may be so biased in regard to their grip on the belt as to facilitate dislodgment of the belt edgewise from the pins. The objective is to have the belt slide axially off of the associated pin and lodge on the upper motor belt pulley through the opening in the upper fork or slot of the belt shifter. This couples the smaller diameter motor pulley to the drum through the belt. The belt shifter may be then actuated, if desired, to shift the belt to a lower larger diameter pulley in well known manner. The shifter should always be set to present the open fork to the low (topmost) speed drive pulley for stringing or restringing the belt over the pulley and drum.

BRIEF DESCRIPTION OF THE DRAWINGS

FIG. 1 is a top plan view of a record player embodying the present invention;

FIG. 2 is a bottom plan view of the turntable and its integral drum with the elastic belt strung thereover, and over one of the belt holding studs;

FIG. 3 is a fragmentary top plan view illustrating in dotted lines the belt shifter and the belt holding stud with the belt strung over the stud in the initial state of assembly;

FIG. 4 is a vertical section taken on the line 4—4 of FIG. 3 showing the turntable cover and the turntable in section and showing also, at the left, the belt holding stud and its relation to the top belt-shifter pulley and its fork;

FIG. 5 is a horizontal section taken on the line 5—5 of FIG. 4 through the turntable drum and the shaft below the horizontal wall of the turntable drum and showing the manner in which the belt holding stud trains the adjacent run of the belt over the face of the top driving pulley;

FIG. 6 shows approximately the angular position of the belt holding stud where it lets go of the belt;

FIG. 7 shows the completed transfer of the belt to the driving pulley completing the normal driving connection between the motor and the turntable;

FIG. 8 is an isometric view of the belt shifter;

FIG. 9 is a fragmentary sectional view taken on the line 9—9 of FIG. 3 of a temporary belt holding pin and the lateral flanges with edges converging toward the pin;

FIG. 10 is a diagrammatic plan view of the belt shifter and the turntable shaft and its bearing; and FIG. 11 is a fragmentary cross section taken on line 11—11 of FIG. 9 through the belt at one of the belt holding pins.

DESCRIPTION OF THE PREFERRED EMBODIMENT

Referring to FIG. 1 which illustrates my invention as embodied in a record player of the type disclosed in the copending application of Dwipendra Nath Guha entitled "Programmer for Record Player", Ser. No. 477,171, filed June 6, 1974, the control and playing elements of which copending application are independent of the specific invention herein disclosed and claimed.

Refer to FIG. 1. There is shown an ornamental rectangular wood base 1 which supports the metal base plate 2, at the left edge of which latter base plate there is an ornamental panel 3 and at the right of which there is a control panel 4 on which are located controls for the various functions to be performed. The present invention is disclosed as embodied in a two speed control 5 which governs the selection of the driving speed pulley of the motor and the consequent corresponding driven speeds of the turntable 6. The metal body 8 of the turntable is preferably a flanged and spoked metal wheel equipped with a combined plastic and metal cover 7 for receiving thereon records to be played at 33 rpm or 45 rpm in this specific setup. The construction of the turntable is disclosed in our copending application entitled "Phonograph Turntable and Mat Assembly," Ser. No. 538,879, filed Dec. 18, 1974.

The metal base 8 of the turntable 6 (FIG. 1) is covered by said plastic cover 7 with its ornamental metallic inserts.

The turntable is served by the tone arm 9 with pickup 10; the tone arm 9 is mounted on the base plate 1 in the manner described and illustrated in the copending application above referred to (Guha, Ser. No. 477,171) through suitable gimbal rings 11 mounted upon a vertical tone arm shaft (not shown) allowing universal motion, of limited extent, of the pickup 10 on the end of the tone arm 9.

The turntable 6 is of multi-part construction comprising a plastic mat with ornamental metal inserts, on a metallic wheel-like structure 12 concealed except at the central portion and at the rim of the flange thereof. A central opening in the plastic cover reveals a small central annular portion of the hub of the metal turntable which carries two diametrically disposed square ended projections 15, 15 on the background of the hub portion 14. These projections—15, 15—on the front face locate the angular positions of the belt engaging pins 16, 16, which pins extend in an axial direction downwardly from the inside of the metal base 8—that is, parallel to the axis of the turntable. The pins 16, 16 are braced laterally by thin truncated triangular webs 17 which extend circumferentially and project axially and hold the said pins radially substantially in register with the upper one-third of the axial dimension of the metallic drum 18. The belt holding studs or pins 16 extend centrally from the tops of said short truncated triangular webs 17 (see FIG. 9); only one of these pins is used at a time (see FIGS. 2, 3, 4, 5, 6 and 7).

The free length of the belt holding studs or pins 16 is preferably shorter than the width of the belt so that the edge of the belt overhangs and tends to slip off of the stud or pin which holds it extended or stretched out radially from the surface of the drum, and as the belt is stretched the overhanging edge portion produces a transverse pull that drags the belt sidewise off of the pin.

The webs 17 which hold each pin or stud 16 are two in number and are positioned diametrically opposite each other and are equidistant circumferentially with respect to the center of the turntable. They establish the edgewise position of the belt 23 on the pins 16. The said pins 16 are disposed at a greater radial distance from the center of the turntable than is the motor shaft 22 or either of the pulleys—namely, the lower pulley 20 which is of the larger diameter, or the upper pulley 21 which is of the smaller diameter—both located on the same motor shaft 22. Therefore, there is no interference.

The belt 23 is trained over the drum 18 and looped over one pin 16 for an assembly operation of mounting the belt on the driving drum 18 and the top motor pulley 21. The drum 18 is wide enough to accommodate the belt in either its upper or its lower position as governed by the position of the shifter 26.

In order to make the transfer of the belt 23—that is, to cause it to leave the pin 16 and contract and embrace the upper pulley 21, known as the low speed pulley—it is necessary to set the pivoted belt shifter 26, which swings in a horizontal plane, above the metal base plate 2 on its pivot pin 27 (see FIGS. 3, 4 and 8) into the position shown in FIG. 3. The power or actuating arm 32 of the belt shifting lever 26 (see FIG. 8) is connected at pin 28 to a link or rod 29 connected in turn to the actuating button 30 moving in a slot on the control panel 4. This connection is not shown in full herein, but is illustrated and described in the copending application of Dwipendra Nath Guha, Ser. No. 477,171, filed June 6, 1974, entitled "Programmer for Record Player." The belt shifter 26 has an entry gate 31 through which the adjacent run of the belt may be lowered from the upper pulley to the lower pulley upon appropriate positioning of the belt shifter 26. This occurs when the control button 30 on the control panel 4 is moved downwardly in the slot 5 shown in FIG. 1. Such adjustment of the angular position of the belt shifter 26 is effected by movement of the belt shifter button 30 on the control panel 4.

By hooking a loop of the belt over the pin 16, which is thereafter brought into vertical alignment with the top motor pulley 21, and starting to rotate the turntable hand clockwise in FIG. 5 to bring the pin 16, the top belt pulley 21, and the drum into horizontal alignment, the pulley 21 and its belt shifter will receive the belt 23 and thus couple the pin 16, the drum 18 and the top pulley 21. If the turntable with the belt looped on the drum and on one of the pins 16 be radially aligned with said pulleys and their belt shifter, and the turntable (with belt) be telescoped axially—that is, assembled by hand—to bring the said parts into horizontal alignment and then the turntable with pin 16 be rotated by hand in a direction to apply the trailing side of the loop to the upper open gate 31 of the belt shifter (clockwise in FIG. 5), the trailing side of the loop will be stretched by the pin which extends it, and the side of the loop ahead of the pulley will tend to pile up on the rear part of the pin, and the belt will slide off of the free end of the pin. This occurs normally within about the first quarter turn of the drum—that is, between the positions shown in FIGS. 5 and 6.

By telescoping with the stationary bearing, the bearing sleeve 13 of the turntable with belt 23 looped over the drum 18 and pin 16 and keeping the pin radially in line with the pulley shaft 22 followed by a clockwise rotation of the drum 18, the belt 23 will match with the top flanged motor pulley 21 and will increasingly unwrap the belt 23 from the pin 16 which, together with the slack produced forwardly of the pin, will cause the belt to slide off of the pin and assume a normal driving relation between the pulley 21 and the drum 18.

The metal base plate has a hollow vertical stationary bearing shaft 13a (FIG. 1) the lower end of which is mounted on the metal base plate 2. The turntable hub has a bore fitting on said tubular bearing and it is held against upward displacement by a spring ring fitting into a groove in the outer end of the stationary tubular bearing. To release the turntable for removal, the operator pries the spring ring off of the end of the said stationary bearing and this releases the turntable for removal by being lifted off of the tubular bearing 13. Replacement of the turntable with the belt strung around the drum 18 and over one of the two pins 16 proceeds with reassembly as above described.

When the drive is to be assembled, the belt 23 is trained over the drum 18 leaving a loose loop which the operator grasps and stretches radially and hooks over one of the two transfer pins 16 as shown in FIG. 2.

Then the enclosed turntable 8 with the belt 23 stretched over the drum 18 and the temporary holding pin 16 (either one) is mounted on the stationary supporting tubular axle 13a.

The belt shifter 26 has previously been set by control button 30 (FIG. 1) at 33 rpm with the slot or gate 31 open to receive the run of the belt which lies below the control (diameter) line which may be drawn through the two square bosses 15, 15 (FIGS. 1 and 3) which line up with the two diametrically located belt holding studs 16, 16 on the lower side of the turntable.

It will be apparent to those skilled in the art that the assembly of the turntable and drum on the turntable shaft with the belt held in the extended loop by means of a pin—such as the pin 16—may be supplemented by making the pin 16 withdrawable from the exterior of the enclosure. However, this introduces a complication and availability of the pin when needed, which difficulty is completely avoided by the concept of making the pin clear itself in the course of rotation of the turntable as above explained. The unique concept resides in the use of the pin as a holding means to get the necessary drive parts assembled in desired cooperating position completed by separating the belt from the pin and allowing it to embrace the motor drum pulley. The automatic means of getting the pin out of the way to complete its function involves the manual act of rotation of the turntable, whereas the separate withdrawal of the pin by hand indicates that an inventive concept is involved in the succession of steps as well as in the specific means employed in performing a particular step as constituting the broadest aspects of the invention. From the standpoint of the method involved, a variation in means for performing specific steps of the method is not necessarily significant.

Upon applying the turntable 6 and its drum 18 with the belt 23 stretched around the drum 18, and stretched in a loop around the adjacent belt holding pin 16 to the stationary hollow bearing stud 13, the loop of the belt 23 (FIG. 2) is extended radially beyond the motor shaft 22 and the pulleys 20 and 21 and, when allowed to contract, takes its place as an operating link in the drive.

In the normal procedure for performing the belt assembly operation, the turntable is first turned upside-down as shown in FIG. 2. The belt 23 is looped about the drum 18 and strung over one of the two downwardly extending pins 16 carried on and projecting from the lower side of the turntable.

This subassembly is then turned right side up and the hub of the turntable is slipped down over the stationary hollow axle 13 which is mounted on the base plate.

The turntable, with belt strung over the drum 18 and the belt holding pin 16, is then turned over (relative to the position shown in FIg. 2) and the bearing sleeve fitted over the hollow axle 13 with the pin 16 that is carrying the extended loop of the driving belt 23 lined up with and radially beyond the upper driving pulley, as shown in dotted lines in FIG. 3. The belt at that time is quite clear of the driving pulley.

Then to get the belt 23, which is stretched out beyond the driving pulley (FIG. 3) into driving engagement with the pulley 21, the turntable with belt extended, as shown in FIG. 3, is swung clockwise, as shown in FIGS. 5 and 6, whereupon the belt 23 slips off the pin 16, whereupon the elastic belt 23 contracts into engagement with the pulley 21 and drum only, completing the drive connection.

We claim:

1. In combination a base plate, a tubular center post mounted vertically upon said base plate, a driving motor mounted on and below the base plate with its shaft extending vertically above the base plate, a pulley mounted on the motor shaft above the base plate, a turntable having a central hub embracing and being rotatable upon said post, said turntable having a belt receiving drum affixed to its lower side coaxial with said hub, said turntable having a temporary belt holding pin on its lower side, said pin extending axially parallel to the axis of the drum and being adapted to hold a loop of the belt radially beyond the aforesaid pulley, said pin being attached at its upper end to the underside of the turntable at a radius substantially beyond the radius of the aforesaid motor pulley, wherein when said turntable is assembled the pulley is placed inside the loop formed by said belt, around said pin and drum, such that said belt will be released from said pin by rotation of said turntable and will contract into engagement with said pulley.

2. The combination of claim 1 wherein the motor shaft carries at a lower level a larger diameter high speed belt pulley and at a higher level a smaller diameter low speed belt pulley, a shifter fork mounted on said base and having a lateral fork opening for admitting the belt to the higher level pulley when the turntable with the belt supported on the holding pin is swung angularly to bring the belt into engagement with the belt shifter.

3. The combination of claim 1 with the motor shaft having two driving pulleys of different diameters, a belt shifter fork mounted on said base and having a gate for admitting the belt to embrace the motor pulley which is uppermost when the belt is released from the holding pin, release of said belt from said pin being caused by rotation of the turntable manually.

4. The method of connecting up for operation a circular turntable rotatably mounted on a vertical shaft on a horizontal said base board has a motor with a vertical shaft extending up through the base board, a belt pulley on said shaft above the base board, said turntable having a circular top with a depending flange having substantially running clearance only with said base plate to provide an enclosure, a drum connected coaxially with and below the turntable, said drum being carried on the lower side of said turntable within the confines of said flange, a belt holding pin attached to the under side of the base plate and disposed radially a greater distance from said shaft than said pulley is from said shaft, an elastic belt stretched over and embracing said pin and extending around the drum and forming a loop, which method comprises mounting said turntable on said shaft with said pulley being inside said loop, and rotating said turntable until said belt leaves said pin and contracts into working engagement with the drum and the motor belt pulley.

* * * * *